Dec. 16, 1969  C. PERE  3,484,088
MULTI-CONVERTERS PNEUMATIC STEELMAKING PLANT
Filed Jan. 10, 1967  7 Sheets-Sheet 1

INVENTOR
CARLO PERE
BY
ATTORNEYS

United States Patent Office 3,484,088
Patented Dec. 16, 1969

3,484,088
MULTI-CONVERTERS PNEUMATIC STEELMAKING PLANT
Carlo Pere, Genoa, Italy, assignor to Societa Italiana Impianti-Societa per Azioni, Genoa, Italy, a joint-stock company of Italy
Filed Jan. 10, 1967, Ser. No. 608,446
Claims priority, application Italy, June 3, 1966, 12,960/66
Int. Cl. C21c 5/28
U.S. Cl. 266—13    11 Claims

ABSTRACT OF THE DISCLOSURE

At least one blowing station and a pair of charging-discharging stations at opposite sides of the blowing station are located along the main track in a steelmaking plant. A number of converters equal to the number of stations less one are movable to shuttle back and forth along the main track so that utilization of the blowing apparatus is increased.

---

The present invention relates to steelmaking plants of the type incorporating a plurality of movable converters.

Steelmaking plants in which the various operations of the cycle, such as the charging of the solid scrap, if required, its pre-heating, the charging of the molten cast iron, the blowing, the steel and slag pouring, the cleaning and the relining of a movable converter, are effected separately at distinct stations, are known and form the subject of my prior patent application Ser. No. 522,491, now Patent No. 3,434,705. In this prior patent application an at least partially closed track or circuit in provided, along which travel, in the manner of a carrousel, one or preferably a plurality of wheeled converters. The main advantages of such steelmaking plants are that the utilization of the blowing apparatus is increased, which apparatus is the most complicated and costly part of the steelmaking plant, and that the steelmaking process may be automated.

This invention relates to an improved pneumatic steelmaking plant of the type provided with mobile converters mounted on wheels or the like, which permits, by parity of production, a considerable reduction in the volumes of the covered areas and the area occupied by the plant and/or a considerable simplification of the whole installation.

The invention is based upon the acknowledgement that the time which is necessary to effect the blowing operation in a converter does not exceed the time which is necessary to effect, in relation to the same converter, all other operations, i.e., the steel- and slag-pouring, the cleaning of the converter mouth, repair of the tapping hole, loading and preheating of the scrap and the charging of the molten cast iron.

According to the present invention, there is provided a pneumatic steelmaking plant of the type provided with at least two mobile converters adapted to be shifted along a path between a blowing station, incorporating steel blowing apparatus, and a charging and discharging station provided with means for effecting steel- and slag-pouring, cleaning of the converter mouth and repairing of the tapping hole, charging of the scrap, and charging of the molten cast-iron, the converters being operable, simultaneously, and being arranged to move to, and stop alternately at, the blowing station and the charging and discharging station, whereby when one converter is located at the blowing station, another converter is located at the charging and discharging station.

In addition to carrying out the aforementioned operations at the charging and discharging station, further operations, and even some more, such as sampling and temperature testing, may be executed thereat.

According to one embodiment of the invention, the blowing station and a charging and discharging station may be located relative to a path or track on which two mobile converters run, in such a manner that when one of the converters is moved towards the blowing station, the other one is moved towards the charging and discharging station, and vice-versa.

According to another embodiment of the invention, the blowing station is located between two charging and discharging station, along a track on which two converters are mounted. The arrangement is such that when one of the converters in operation is wheeled towards either one of the charging stations, the other converter is wheeled towards the single blowing station, and vice-versa.

This permits a further reduction in the area occupied by the steelmaking plant and a simplification of the movement of the converters, which may be shifted along a substantially straight or slightly curved track.

When the latter embodiment is applied to LD (Linz-Donawitz) type steelmaking plants in which the charge is directly subjected to blowing (single-stage process), the two stations provided on opposite sides of the blowing stations are simple charging and discharging stations. However, when the said embodiment is applied to steelmaking plants of the type which operate according to a two-stage process, including other operations which are carried out upon the charge, before or after blowing, two combined charging, discharging and blowing stations are provided on opposite sides of an intermediate blowing station, in which combined stations the other operational steps are also effected.

By further developing the aforesaid concept of a single blowing station intermediate two charging and discharging stations, steelmaking plants might be constructed, in which two or more auxiliary stations may be provided on one or both sides of the blowing station, the number of converters in operation being equal to the number of all stations minus one. In the case of steelmaking plants operating according to a single-stage LD process, the outer station on each side of the blowing station is a charging and discharging station, whilst the other intermediate station or each intermediate station, i.e., that located between the blowing station and the outer charging and discharging station, is a combined charging, discharging and blowing station. In the case of pneumatic steelmaking plants operating in accordance with a two-stage process, all the stations provided on each side of the blowing station are combined charging, discharging and blowing stations.

In order that the invention may be more readily understood, various preferred embodiments thereof will now be described with reference to the accompanying drawings, in which.

Figure 1:
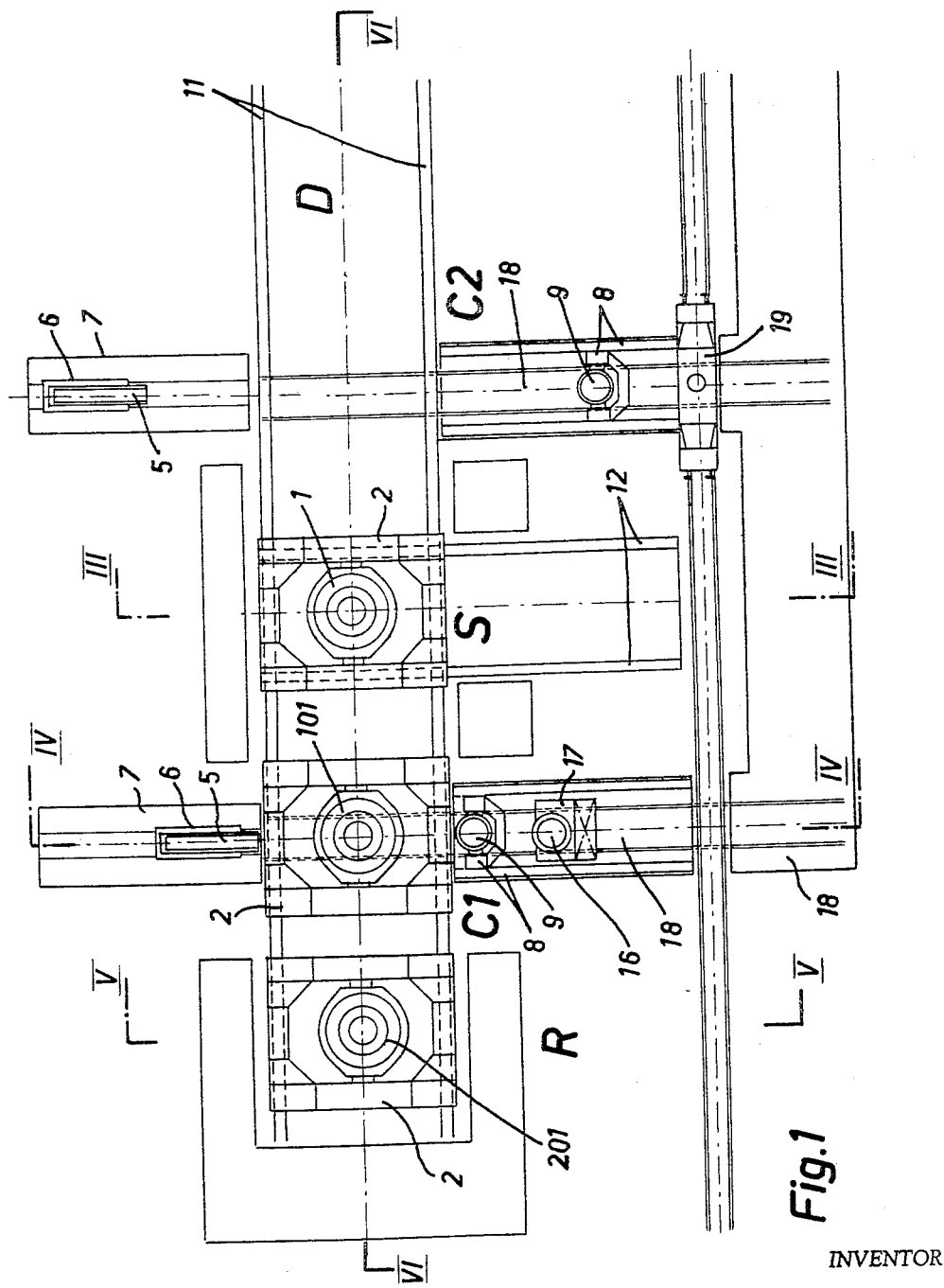
FIGURES 1 and 2 are diagrammatic plan views of a pneumatic steelmaking plant according to one embodiment of the invention, provided with a blowing station arranged between two charging and discharging stations, and operating in conjunction with a pair of mobile converters shown in two different operating positions.

In the embodiment shown in FIGURES 1 to 6, the pneumatic steelmaking plant comprises a substantially straight multi-rail track 11 on which travel trucks 2 carrying three converters 1, 101, 201. The construction of the trucks and their driving and controlling arrangements do not form a part of the present invention and will not therefore be described herein.

Intermediate the ends of the track 11 is mounted a blowing station S, located between two auxiliary charging and discharging stations C1 and C2 spaced apart along the track, in each of which all other operations, including steel- and slag-pouring, converter mouth cleaning and repair of the tapping hole, charging and pre-heating of scrap and charging of molten cast iron, may be effected.

The track 11 has extensions on the sides of the two charging and discharging stations C1, C2 remote from the station S. On one of these extensions is located a converter relining station R while the other extension D enables withdrawal of at least one converter.

Between the two charging and discharging stations C1, C2, and preferably in alignment with the blowing station S, a secondary track 12 branches off the main track 11 in a direction perpendicular thereto. The wheeled or mobile converters 1, 101, 201 may be transferred from the main track 11 to the secondary track 12, and vice-versa, by means of a turntable (not shown) positioned at the intersection of tracks 11 and 12, or by hydraulically actuated converter-lifting feet extending upwardly out of the surface on which the tracks are mounted or extending downwardly out of the converter trucks themselves. The manner in which this transfer from one track to the other may be conventional, and will not therefore be described herein.

In this embodiment, one of the converters 201 is positioned at the relining station R, and constitutes a reserve converter, while the other two converters 1, 101 are working converters and travel or reciprocate, preferably simultaneously, back and forth, i.e., to the right and left, and vice-versa, upon track 11.

Figure 2:
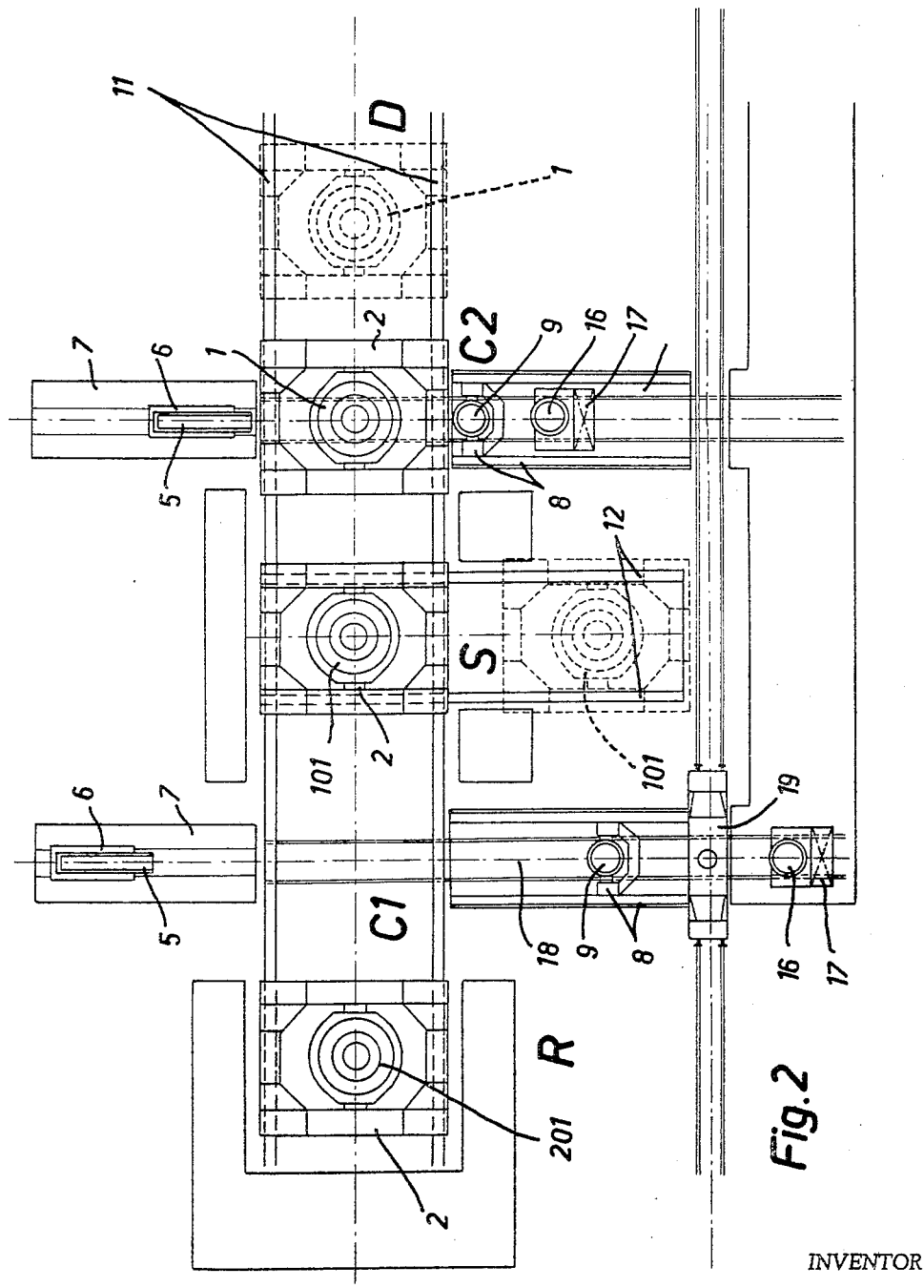

In the position shown in FIGURE 1, the converter 1 is in the blowing station S, while the converter 101 is in the left-hand charging and discharging station C1, where all remaining operations including sampling, temperature and compoistion checking, steel- and slag-pouring, cleaning of the converter mouth and repair of the tapping hole, scrap charging and preheating and charging of the liquid cast iron are effected, and which, altogether, take a time which is less than the blowing time at the station S. Therefore, when the blowing of the converter 1 at station S is completed, the converter 101 at the charging and discharging station C1 is ready for blowing. The pair of converters 1, 101 is consequently then transferred towards the right, on the main track 11, until converter 101 reaches the blowing station S and the converter 1 reaches the right-hand charging and discharging station C2 as shown in FIGURE 2.

When the blowing operation of the converter 101 has been completed, the converter pair 1, 101 is transferred towards the left, to the position as shown in FIGURE 1, with the converter 1 at the blowing station S and the converter 101 at the left-hand charging and discharging station C1, thus repeating the above described cycle.

Thus the blowing station S is utilized practically without interruption by operating alternately on either one of the converters 1, 101.

Whenever renewal of the lining of either of the converters 1, 101 is necessary, that particular converter is transferred to the station R and is replaced, in the working cycle, by the converter 201.

For example, in order to bring the converter 101 to the relining station R, the pair of converters 1, 101 is first moved to the position shown in FIGURE 2 and thereafter the converter 101 is transferred from the blowing station S to the secondary track 12 while the converter 1 is further moved to the right and passes from the right-hand charging and discharging station C2 to the extension or siding D at the end of the main track 11, as shown by the broken lines in FIGURE 2. The spare converter 201 is then transferred from station R to station C2, and the converter 101 is successively returned from the blowing station S to the main track 11 and then transferred to the re-lining station R.

The converter 1 may also be transferred to the station R in a similar manner. For this purpose, the two converters 1, 101 are first moved to the position as shown in FIGURE 1, and thereafter the converter 1 is transferred to the secondary track 12. The two converters 101, 201 are then moved along main track 11 until the converter 101 is positioned in the extension or siding D and the converter 201 is positioned at the right-hand charging and discharging station C2. The converter 1 is then again transferred to blowing station S on main track 11 and moved to relining station R.

The installations and apparatus of the individual stations S, C1, C2 and R may be operated in any suitable manner, preferably automatically and without overhead travelling cranes, so that they may be remote controlled both from a local control position for semiautomatic operation, as well as from a central control position, for completely automated operation of the cycle.

Figure 3:
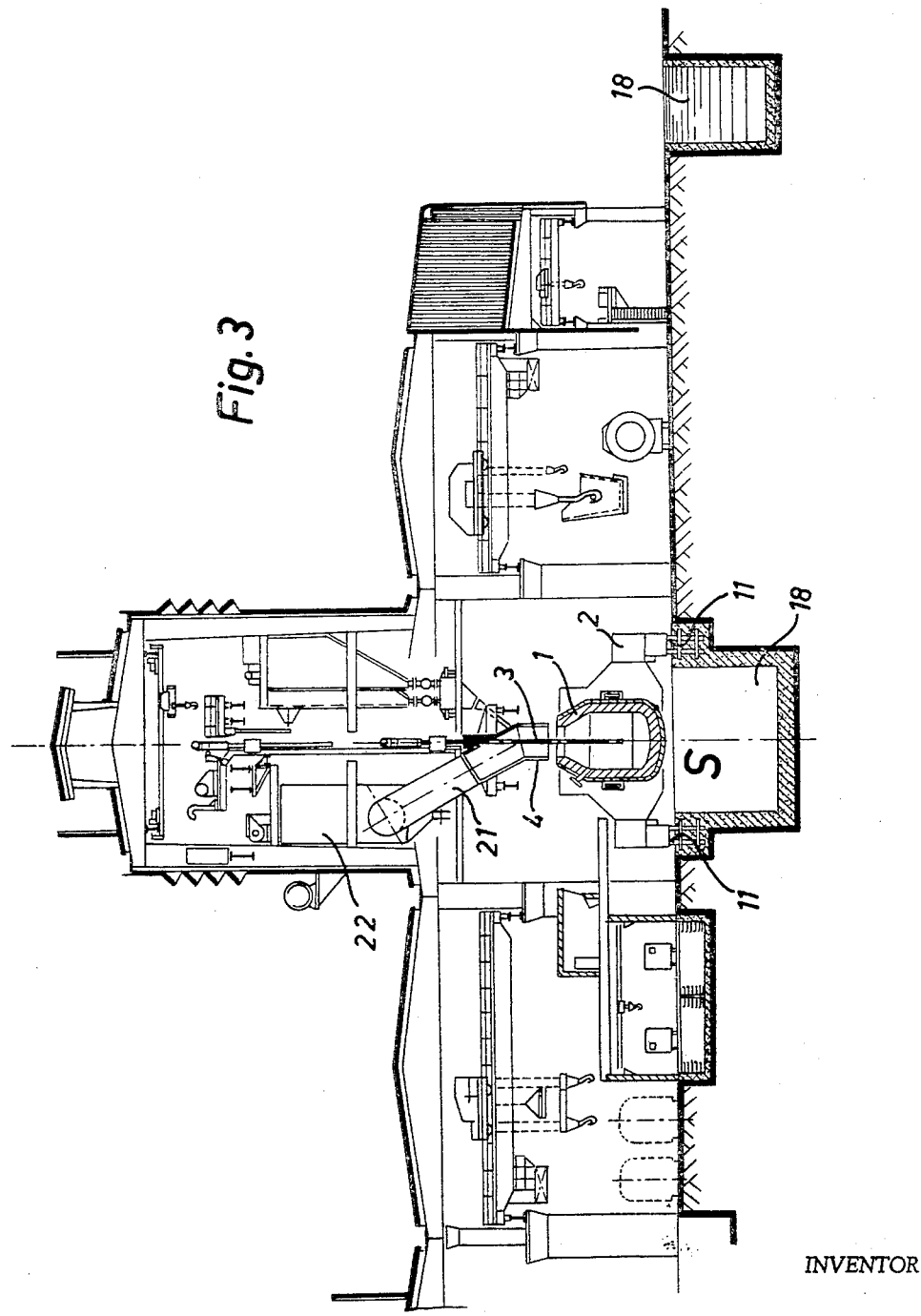
FIGURES 3, 4, 5 and 6 are vertical sections taken respectively on the lines III—III, IV—IV, V—V and VI—VI of FIGURE 1.

At the blowing station S, as shown in FIGURE 3, there are provided lances 3 for blowing oxygen into the converter as well as a hood 4 for collecting and conveying gases rich in carbon monoxide evolved during blowing. The addition of additives and possibly other refining operations, may be accomplished at this station S, and at the end of the blowing operation, complementary operations such as sampling and checking may also be effected.

Figure 4:
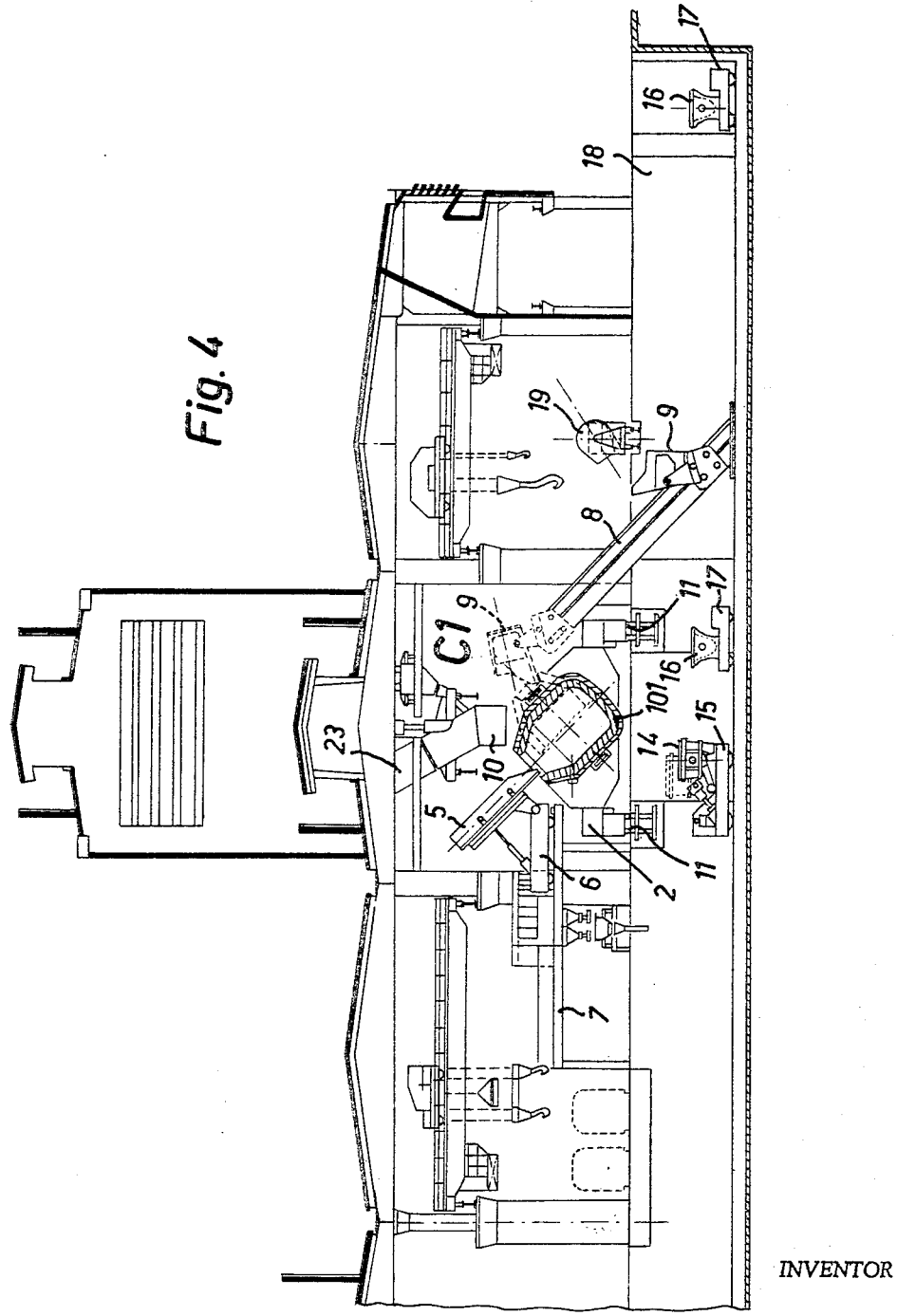

The charging and discharging stations C1, C2 are exactly alike and both include means for pouring the steel and slag, and means for charging the converters with scrap and with liquid cast iron. A converter, when located at either station C1, C2 after a blowing operation is first tilted to one side and the steel is poured therefrom into a ladle 14 carried by a conveyor truck 15, whereafter it is tilted to the opposite side and slag is evacuated therefrom into a bin 16 mounted upon a truck (FIGURE 4). The trucks 15, 17 respectively carrying the ladle 14 and bin 16 preferably travel in a trench 18 at a level lower than that of the track 11.

Therefore, the converter may be mounted upon a truck 2, of reduced height, which possesses the advantage of greater stability and enables the ladles 14 and bins 16 to be easily wheeled thereunder to receive the steel and slag, respectively.

After the emptying of a converter at the station C1 or C2 that converter and in particular, the mouth thereof, is cleaned, and the repair of the tapping hole and the checking of the refractory lining is carried out.

In each station C1, C2 means are provided for charging a converter with scrap, arranged on one side of the track 11, and means for charging the converter with molten cast iron, arranged on the opposite side of the same track. Thus, after repair of the lining and tapping hole as aforesaid, the converter is first tilted to one side and receives a solid scrap charge, for example from a tiltable container 5 mounted on a truck 6 running upon a bridge 7, as shown in FIGURE 4. The converter is then swung back into an erect position, in which position its mouth opens under a hood 10 which communicates with collecting hood 4 (FIGURE 6) at the blowing station S through ducts 23, 21 and purifiers 22. The carbon monoxide-rich gases evolved during the blowing operation at station S are thus conveyed to either one of the charging and discharging stations C1, C2, and are burned within the corresponding converter located thereat, thus preheating the scrap charge.

Once preheating of the scrap charge has been effected, the converter is tilted to the opposite side and receives a molten cast-iron charge, for example, by means of a ladle 9 when raised by an elevator 8 to the position shown by broken lines in FIGURE 4. The elevator 8 extends downwardly into a trench 18, and the ladle 9 may be lowered into said trench 18 below the track level of the converters 1, 101, 201, as shown in full lines, to receive the molten cast-iron charge from a torpedo-shaped wheeled container 19 running on tracks substantially at the same level as the converter track 11. The elevator is constructed with inclined side tracks which enable the bin 16 on the truck 17 to move thereunder when the ladle 9 has been raised to a sufficient height.

From the foregoing description it is apparent that in each station C1, C2 the charging of the scrap and molten cast-iron, and the pouring of steel and slag are effected on the same transverse line, i.e., without moving the converter along its track 11, but are effected at different levels. This is an important feature and considerably reduces the floor space required by the steelmaking plant.

Figure 5:
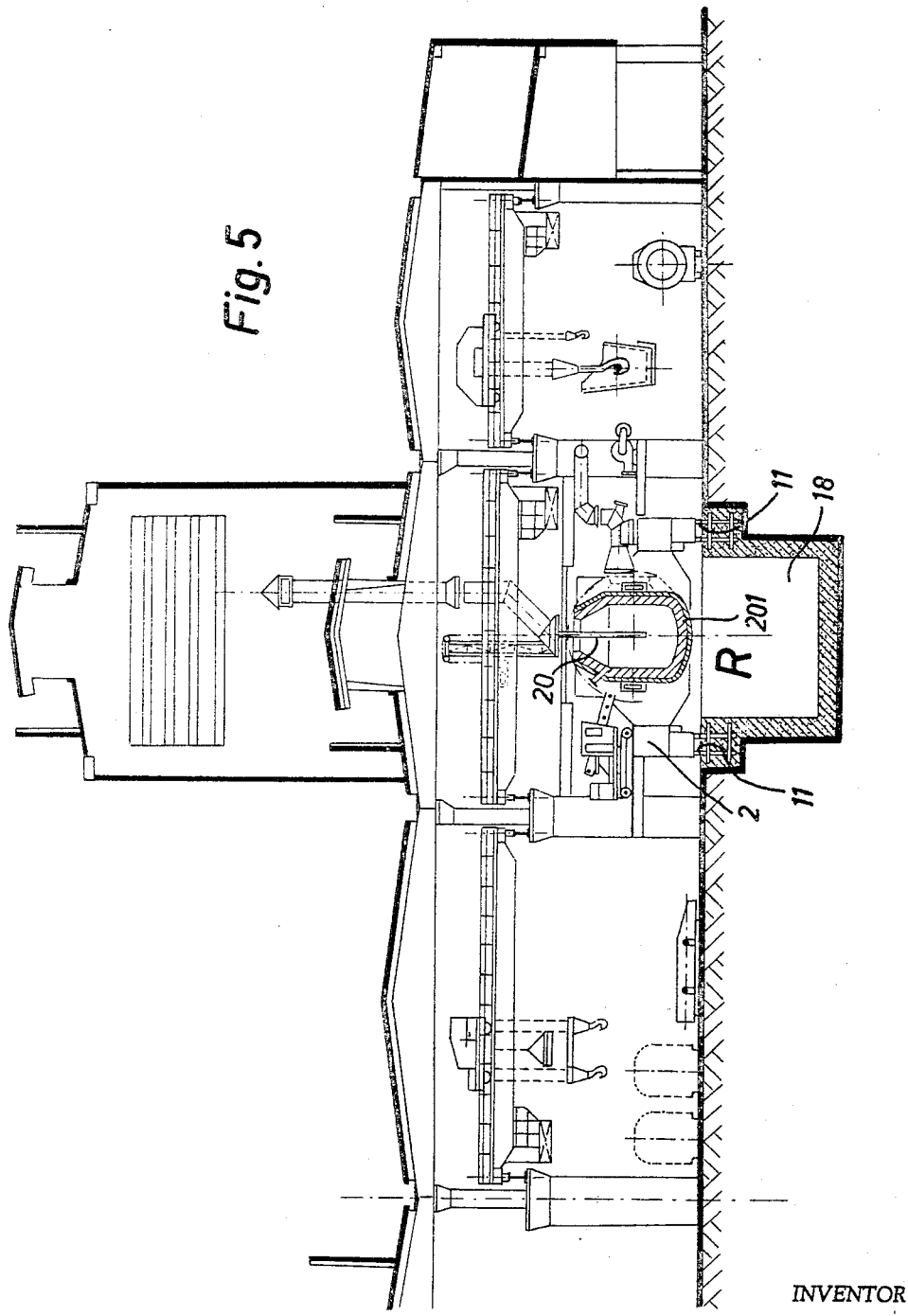
Figure 6:
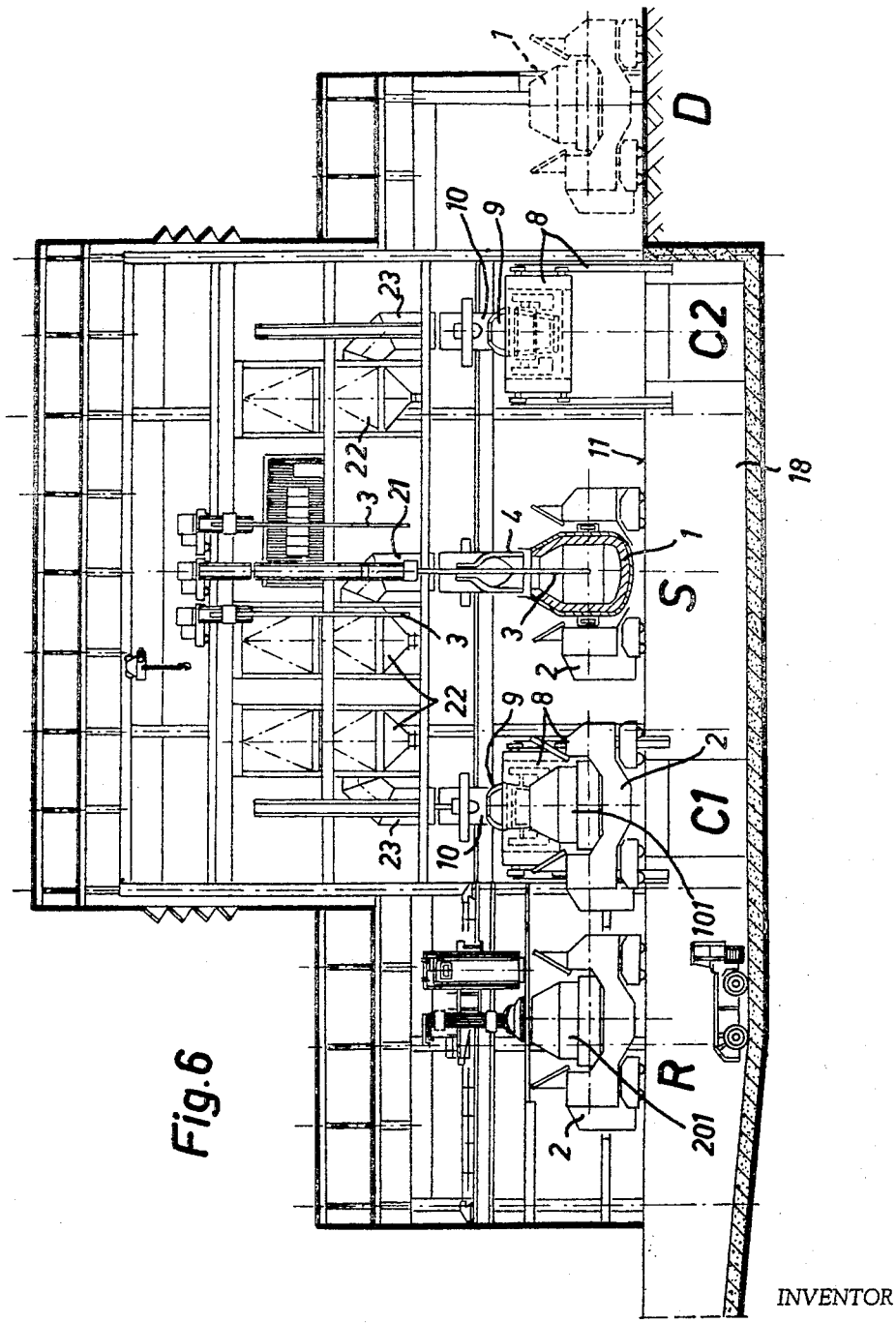

At the converter relining station R, in addition to the conventional converter-cooling, lining breaking-down, restoring and drying means, as shown in FIGURE 5, there is also provided a small air- or oxygen-blowing lance 20 for warming up the converter by burning therein coke of other fuel, before the converter is returned into the operation cycle.

Figure 7:
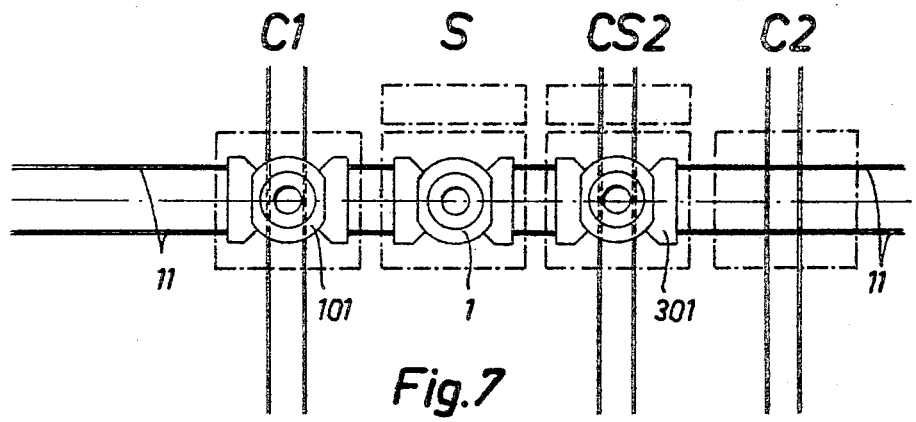
FIGURES 7, 8 and 9 are diagrammatic plan views of various other embodiments of the steelmaking plant according to the invention.

FIGURE 7 illustrates a variation of the arrangement of the steelmaking plant previously described. In this embodiment, a single charging and discharging station C1 is provided on one side of the blowing station S, while on the opposite side of the same station two auxiliary stations CS2 and C2 are provided, of which the outer one C2 like the station C1, is a charging and discharging station, while the intermediate station CS2 is a composite charging, discharging and blowing station. In this plant three converters (1, 101, 301) are in simultaneous operation, and are moved in unison towards the right and the left, so that the converter 101 is charged at the station C1 and the converter 1 is charged at the combined station CS2. Both converters 1, 101 are blown alternately, at the station S. The converter 301 is, instead, charged and discharged at station C2 and is blown at the combined station CS2, which it occupies alternately with the converter 1.

Figure 8:
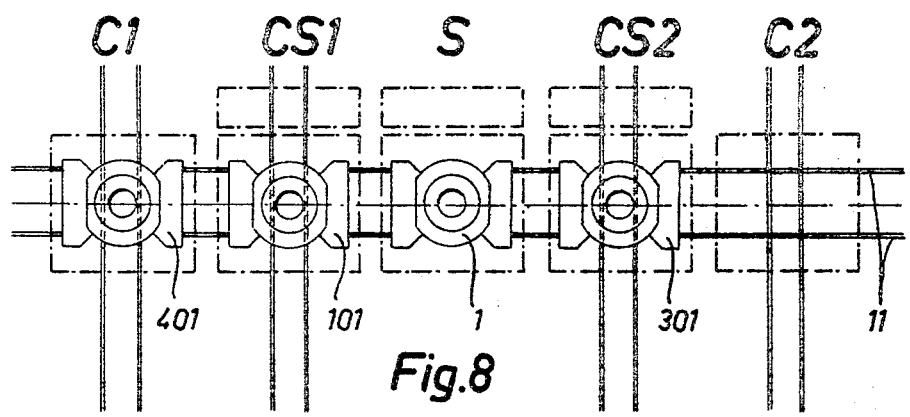

In the embodiment illustrated in FIGURE 8, two auxiliary stations CS1, C1, and CS2, C2, respectively, are provided on each side of the blowing station S. The two outer stations C1 and C2 are charging and discharging stations, like those described with reference to figures 1 to 6, while the intermediate stations CS1 and CS2 are combined charging, discharging and blowing stations. In this embodiment there are four converters (1, 101, 301, 401) in simultaneous operation, and these are moved together alternately to the right and left. The two intermediate converters 1 and 101 are alternately blown at the blowing station S and are charged and discharged in the combined station CS2 and CS1, while the two outer converters 401 and 301 are charged and discharged in the respective outer stations C1 and C2 and are blown in the intermediate combined stations CS1, CS2 which they occupy alternately with the converters 101 and 1.

The previously described embodiments relate to LD steelmaking plants employing a single-stage process. For this type of plant the following general rule may be established: assuming $n$ to be the number of the converters in operation, the total number of the stations arranged along the path of these converters in $n+1$, of which one is an intermediate blowing station, both outer ones serving for charging and discharging, and the remaining $n-2$ stations being combined charging, discharging and blowing stations.

Figure 9:
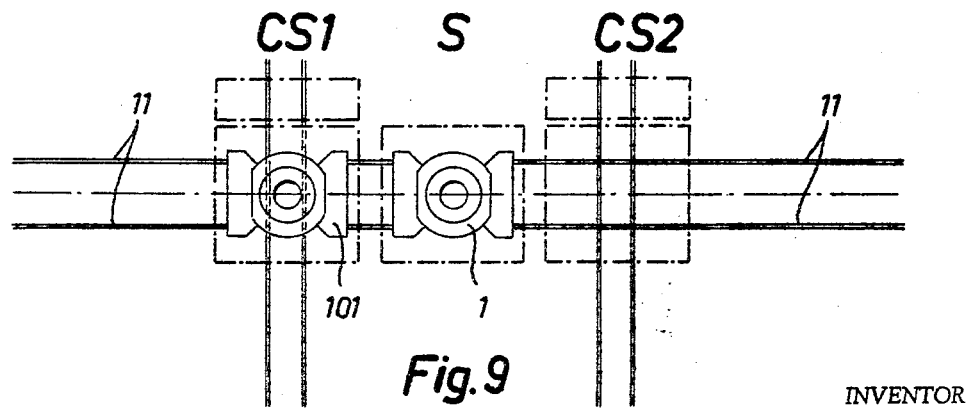

FIGURE 9 shows a two-stage pneumatic steelmaking plant embodying the invention, in which the charges are subjected to preblowing and/or after-blowing operations or treatments such as, for example, an LD–AC process, an LD process with previous desulphuration, or an LD process with after-blowing. The embodiment shown in FIGURE 9 is different from that shown in FIGURES 1 to 6, in that combined charging, discharging and blowing stations CS1, CS2 are provided on both sides of the blowing station S. The two converters 1, 101 are alternately blown at the central station S while they are each charged and discharged at the respective side station CS1 or CS2 where the pre-blowing and after-blowing operations, or the other treatments which precede or follow the blowing operation proper, are effected.

The embodiments shown in FIGURES 7 and 8 may be modified in a similar manner for steelmaking plants employing a two-stage process, by making all of the stations on both sides of the blowing station S, combined charging, discharging and blowing stations. As a general rule, in steelmaking plants working with a two-stage process, assuming $n$ to be the number of the mobile converters in operation on track 11, the total number of the stations arranged on the path of said converters is $n+1$, of which one is an intermediate blowing station, and the other ones $n$ are combined charging, discharging, and blowing stations.

The combined charging, discharging and blowing stations CS1, CS2 may be constructed as described with reference to the stations C1 and C2 of FIGURE 4, with the addition of a blowing apparatus. Each combined charging, discharging and blowing station may be, if necessary, divided so as to comprise a separate blowing station and a charging and discharging station.

It will be understood that the invention is not limited to the embodiments hereinbefore described and illustrated, but that various modifications may be made, particularly with regard to the construction of the different components of the stations, without departing from the scope of the present invention as defined in the appended claims. For example, in the foregoing embodiments, the tracks 11 may be curved instead of straight and, in particular, may be arranged to form a closed loop or circuit around which the converters travel in the manner of a carrousel.

I claim:

1. A pneumatic steelmaking plant of the type provided with at least two mobile converters movable along a main track between a number of stations located along the track, said stations comprising a blowing station incorporating steel blowing apparatus, and at least two converter-charging and discharging stations disposed on opposite sides of said blowing station along said main track, each charging and discharging station incorporating slag and steel pouring means adapted to pour molten steel and slag from a converter, means to clean the converter mouth and repairing of the tapping hole, scrap charging means to charge the converter with scrap, and iron charging means to charge the converter with molten cart-iron, said converters being operable simultaneously and being arranged to move to, and stop alternately at, the blowing and charging and discharging stations, the arrangement being such that when one of the converters is located at the blowing station, another converter is located at the charging and discharging station.

2. A pneumatic steelmaking plant of the type provided with at least two mobile converters movable along a main track between a number of stations located along the track, said stations comprising a blowing station incorporating steel blowing apparatus, and at least two converter-charging and discharging stations disposed on opposite sides of said blowing stations in the direction of the main track and incorporating slag and steel pouring means adapted to pour molten steel and slag from a converter, means to clean the converter mouth and repairing of the tapping hole, scrap charging means to charge the converter with scrap, iron charging means to charge the converter with molten cast-iron, said con- ranged to move to, and stop alternately at, the blowing and charging and discharging station, the arrangement being such that when one of the converters is located at the blowing station, another converter is located at the charging and discharging station, the converters being equal in number to the total number of blowing and charging and discharging stations less one, at least one secondary track joined to the said main track and means adapted to transfer the converters from one track to the other.

3. A plant according to claim 2, in which the main track is at least in part substantially straight, the secondary track is disposed substantially perpendicular to the main track, and, the transfer means are located at the intersection of the main and secondary tracks.

4. A plant according to claim 3, in which said main track extends beyond at least one charging and discharging stations, the extension accommodating a converter-relining station.

5. A plant according to claim 4, including at least one additional reserve converter accommodated on at least one of the secondary track and an extension of the main track.

6. A multiconverter single stage steelmaking plant according to claim 2, including an intermediate blowing station, two simple charging and discharging stations located one on each side of the blowing station, and at least one additional combined charging, discharging and blowing station being provided between the intermediate blowing station and at least one charging and discharging station.

7. A multiconverter two stage steelmaking plant according to claim 2, wherein all charging and discharging stations are adapted to function as combined charging, discharging and blowing stations.

8. A plant according to claim 6, in which at least at one of the charging and discharging stations or combined stations, the scrap charging means and the molten cast iron charging means as well as the steel and slag pouring means are disposed on the same line, but at different heights.

9. A plant according to claim 8, in which the steel pouring means comprises wheeled ladles, and the slag pouring means comprises wheeled bins, said means running in a trench at a lower level than that of the converters.

10. A plant according to claim 9, in which the scrap charging means and the cast iron charging means are arranged on opposite sides on the main track.

11. A plant according to claim 10, in which the cast iron charging means comprises an elevator provided with a tiltable ladle adapted to descend below the level of the main track to receive the cast iron from a mobile container mounted for movement substantially at main track level.

References Cited
UNITED STATES PATENTS

| | | | |
|---|---|---|---|
| 2,535,932 | 12/1950 | Kemock | 266—42 |
| 3,013,789 | 12/1961 | Sayre et al. | 266—36 |
| 3,257,105 | 6/1966 | Heemeyer | 266—13 |
| 3,271,020 | 9/1966 | Heemeyer | 266—13 |
| 3,331,681 | 7/1967 | Mobley | 266—34 X |
| 3,335,445 | 8/1967 | Kinzler | 266—34 |
| 3,362,700 | 1/1968 | Metz et al. | 266—13 X |

J. SPENCER OVERHOLSER, Primary Examiner

J. S. BROWN, Assistant Examiner